United States Patent
Jarnikov et al.

(10) Patent No.: US 9,955,200 B2
(45) Date of Patent: Apr. 24, 2018

(54) SYSTEMS AND METHODS FOR SECURING POLYMORPHIC CONTENT

(71) Applicant: Irdeto B.V., Hoofddorp (NL)

(72) Inventors: Dmitri Jarnikov, Hoofddorp (NL); Wim Mooij, Hoofddorp (NL)

(73) Assignee: IRDETO B.V., Hoofddorp (NL)

( * ) Notice: Subject to any disclaimer, the term of this patent is extended or adjusted under 35 U.S.C. 154(b) by 0 days.

(21) Appl. No.: 15/129,689

(22) PCT Filed: Mar. 28, 2014

(86) PCT No.: PCT/IB2014/001197
§ 371 (c)(1),
(2) Date: Sep. 27, 2016

(87) PCT Pub. No.: WO2015/145194
PCT Pub. Date: Oct. 1, 2015

(65) Prior Publication Data
US 2017/0142459 A1    May 18, 2017

(51) Int. Cl.
*H04N 7/173*    (2011.01)
*H04N 21/254*    (2011.01)
(Continued)

(52) U.S. Cl.
CPC ......... *H04N 21/2541* (2013.01); *A63F 13/73* (2014.09); *G06F 3/013* (2013.01);
(Continued)

(58) Field of Classification Search
CPC ........... H04N 21/8541; H04N 21/2541; H04N 21/26613; H04N 21/4353;
(Continued)

(56) References Cited

U.S. PATENT DOCUMENTS

| | | | |
|---|---|---|---|
| 2005/0050333 A1* | 3/2005 | Yeap | H04N 21/4181 713/182 |
| 2009/0019496 A1* | 1/2009 | Amira | H04N 7/17318 725/61 |

(Continued)

FOREIGN PATENT DOCUMENTS

WO    2013004597 A1    1/2013

OTHER PUBLICATIONS

International Search Report and Written Opinion cited in corresponding International Application No. PCT/IB2014/001197 dated Nov. 12, 2014.

(Continued)

*Primary Examiner* — John Schnurr
(74) *Attorney, Agent, or Firm* — Rimon, P.C.; Mark Kaufman

(57) ABSTRACT

Computer-implemented systems, methods, and computer-readable media for selecting a sequence of content parts from polymorphic content of an audiovisual presentation based on at least one profile of a user include receiving content information associated with polymorphic content, receiving profile information of a user, and selecting for rendering, from amongst the alternative content parts, a sequence of content parts from the polymorphic content based on at least a portion of the profile information.

14 Claims, 16 Drawing Sheets

(51) Int. Cl.
| | |
|---|---|
| *G06F 3/01* | (2006.01) |
| *H04N 21/4627* | (2011.01) |
| *H04N 21/4405* | (2011.01) |
| *H04N 21/266* | (2011.01) |
| *H04N 21/435* | (2011.01) |
| *H04N 21/44* | (2011.01) |
| *A63F 13/73* | (2014.01) |

(52) U.S. Cl.
CPC ... *H04N 21/26613* (2013.01); *H04N 21/4353* (2013.01); *H04N 21/4405* (2013.01); *H04N 21/44016* (2013.01); *H04N 21/4627* (2013.01)

(58) Field of Classification Search
CPC ......... H04N 21/44016; H04N 21/4405; H04N 21/4627; A63F 13/73; G06F 3/013
See application file for complete search history.

(56) References Cited

U.S. PATENT DOCUMENTS

| | | | |
|---|---|---|---|
| 2011/0013773 A1* | 1/2011 | Pinder ................. | G06F 21/602 380/210 |
| 2011/0307924 A1 | 12/2011 | Roberts et al. | |
| 2013/0094830 A1* | 4/2013 | Stone ................... | H04N 5/775 386/230 |
| 2014/0040930 A1 | 2/2014 | Gates, III et al. | |

OTHER PUBLICATIONS

Paul Kocher et al., "Self-Protecting Digital Content—A Technical Report from the Cri Content Security Research Initiative", RSA 2004, Feb. 23, 2004.
Communication pursuant to Article 94(3) EPC issued in EP patent Application No. 14759254.7, dated Oct. 19, 2017, 7 pages.

* cited by examiner

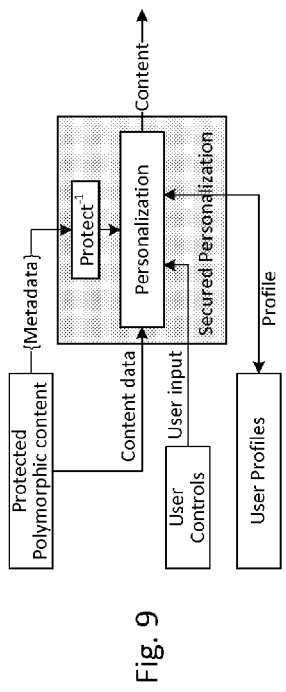
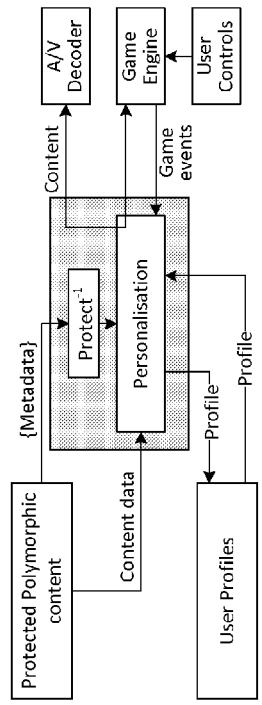
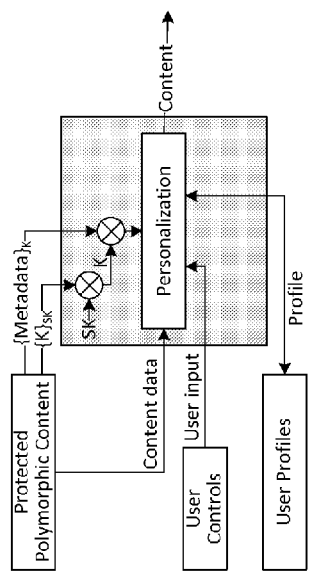
Fig. 9
Fig. 10
Fig. 11

SYSTEMS AND METHODS FOR SECURING POLYMORPHIC CONTENT

The present application is the United States national stage of International Application No. PCT/IB2014/001197, filed Mar. 28, 2014, the entire content of which is incorporated herein by reference.

BACKGROUND

Much audio, visual or audiovisual content, such as movies or motion pictures, consist of a linear sequence of events. Movies, for example, are distributed in a wide range of formats, such as digital cinema, optical discs and internet-based streaming formats. In digital cinema (e.g., IMAX), the movie is displayed in a theater on a large screen using very high (e.g., Ultra HD television) resolution. More recent formats use lower resolution. Optical discs (e.g., DVDs) often contain the movie rendered at HDTV resolution. Internet-based streaming formats traditionally use standard-deviation television (SDTV) resolution.

Optical disc formats can support multi-viewpoints or versions (called "angles") of at least certain scenes of the movie, although this feature is not widely used. The viewer or end-user has the ability to select one of multiple viewpoints in a way that resembles channel selection in broadcast TV networks.

U.S. Patent Application Publication No. 2014/0019767 describes the Irdeto Tracemark® fingerprinting technologies. This application describes the use of content sections that include different watermarks, where the receiver/player selects one of these sections during rendering. A sequence of such differently watermarked sections in the content forms a fingerprint in the output that can be traced back to a specific player or a group of players. Such technology is used in broadcasting, on pre-recorded media (e.g., DVD and BD+), and in live streaming Internet Protocol television (IPTV).

Movie, and other conent, distribution generally uses some form of media protection to prevent the unauthorized redistribution of the digital content. This often requires the encryption of the digital content, which is decrypted and further processed in a trusted functional module within the display, or other type of rendering equipment. The trusted module contains secret data such as cryptographic keys. Examples of such modules are Digital Rights Management (DRM) modules and Conditional Access (CA) smart cards. Such modules rely on tamper resistance to ensure the functional integrity of the modules.

Optical discs typically use protection techniques (e.g., Content Scramble System (CSS) and Advanced Access Content System (AACS)) that encrypt the content with a content encryption key which is stored on the disc in encrypted form. The processing to decrypt the content requires protection against a so-called "whitebox" attack scenario. Known protection schemes are hardware tamper resistance techniques and software obfuscation (e.g., such a system is disclosed in U.S. Pat. Nos. 6,594,761 and 6,842,862 ("whitebox cryptography technology")).

Computer games use short, movie-like fragments in between different "levels" or "stages" during gameplay that are rendered using the game engine. Game consoles also rely on DRM techniques to protect against unauthorized distribution (e.g., cloning of the disc content).

As shown in FIG. 1, traditional (audiovisual) content includes a linear sequence of content parts $P_i$, $P_{i+1}$, $P_{i+2}$, $P_{i+3}$, etc., as shown in FIG. 1. Typically, each content part $P_i$, $P_{i+1}$, $P_{i+2}$, $P_{i+3}$, etc., contains a sequence of images that forms a certain time period, such as a second, of content. Each content part $P_i$, $P_{i+1}$, $P_{i+2}$, $P_{i+3}$, etc., thus forms a random access point into the content. Often, content parts $P_i$, $P_{i+1}$, $P_{i+2}$, $P_{i+3}$, etc., are encoded in a way that enables decoding to start efficiently at the beginning of the content part. An example of this type of content encoding is MPEG 2.

The Tracemark® fingerprinting technologies duplicate one or more content parts, associate a different watermark with each copy, and place or insert the results into modified content, as shown in FIG. 1A. In particular, FIG. 1A shows two alternatives for the content part $P_{i+1}$ and the content part $P_{i+3}$. The content viewer or player selects one of the alternatives during playback. This results in an output stream with a single marked set of content parts. If each marking carries a single bit of information ($P^0$ or $P^1$), the output sequence for the short sequence of content parts in the figure carries two bits of marking information. Richer and denser marking information can be achieved by longer sequences of replacement content parts or by including more duplicate versions for the replacement content parts.

U.S. Patent Application Publication No. 2011/0211695 (Westerveld) describes a variant of the above scheme, where the selection of the content parts is implemented by the error correction module in the player or receiver. Each of the two differently watermarked content parts ($P^0_{i+1}$ and $P^1_{i+1}$) is encrypted differently (e.g., using a different key). As both these content parts are decrypted similarly (using the same key and algorithm), one of the versions will be converted into random data. This random data then is removed by the error correction module. This makes it possible to perform the watermark selection without requiring special switching logic in the player, which makes this technique applicable to legacy players.

Great Britain Patent Application Publication Nos. 2424351 B (Ingrosso) and 2470617 A (Abram) describe polymorphic content formates that consist of alternative content parts, as shown in FIG. 2. In particular, FIG. 2 shows at least one or multiple alternatives for each content part $P_i$, $P_{i+1}$, $P_{i+2}$, $P_{i+3}$, etc. Each alternative contains different content (e.g., encoded material). At the boundaries of the alternative content parts, the content allows for transitions to other alternative content parts. For convenience, the content parts are shown as having equal length, although in practical implementations, the duration of alternative content parts can vary significantly. The player may select between the variants to generate a unique version of the content, as shown in FIG. 4.

Ingrosso describes a player architecture, as shown in FIG. 4. In particular, FIG. 4 shows the polymorphic movie content that is contained on a pre-recorded optical disc (e.g., a DVD). In addition to the normal audio and video data, the optical disc contains metadata describing the available alternative content parts. The metadata is stored in a polymorphic movie data base, which is used to generate a sequence of alternative content parts that form a valid content output. Ingrosso describes various details that constrain the sequence generation to meet various creative and logical conditions for a valid output sequence. During playback a pseudo random number generator is used to trigger one of the possibly many different output sequences.

It is well known to alter presentation of content in an interactive game in response to user inputs during the game play. For example, U.S. Pat. No. 8,668,563 (Reynolds) discloses a gaming engine which a user controls actions of a character in game play. FIG. 6 shows a game engine as disclosed by Reynolds.

BRIEF DESCRIPTION OF THE DRAWINGS

It should be understood that the drawings and description are not intended to be limiting to the particular form disclosed. Rather, the present disclosure covers all modifications, equivalents and alternatives falling within the spirit and scope of the appended claims. The foregoing summary, as well as the following detailed description of the invention, will be better understood when read in conjunction with the appended drawings. For the purpose of illustrating the disclosure, there are shown in the drawings various illustrative embodiments. It should be understood, however, that the disclosure is not limited to the precise arrangements and instrumentalities shown. In the drawings:

FIG. 9 is a schematic diagram of a player architecture with a secured personalization module according to an embodiment of the present disclosure;

FIG. 10 is a schematic diagram of a player architecture with a secured personalization module that combines certain portions of the embodiments shown in FIGS. 8 and 9;

FIG. 11 is a schematic diagram of a player architecture with a secured personalization module using cryptography for protecting metadata according to an embodiment of the present disclosure;

DETAILED DESCRIPTION

Figure 1:
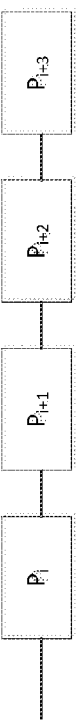
FIG. 1 is a schematic diagram of traditional (audiovisual) content according to the prior art.
Figure 1A:
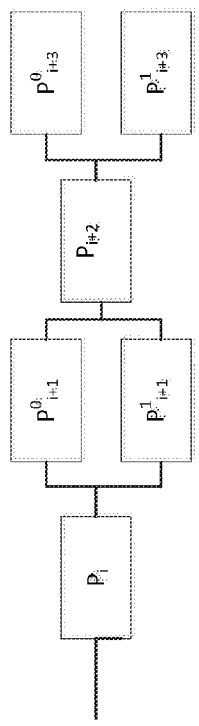
FIG. 1A is a schematic diagram of modified content according to the prior art.
Figure 2:
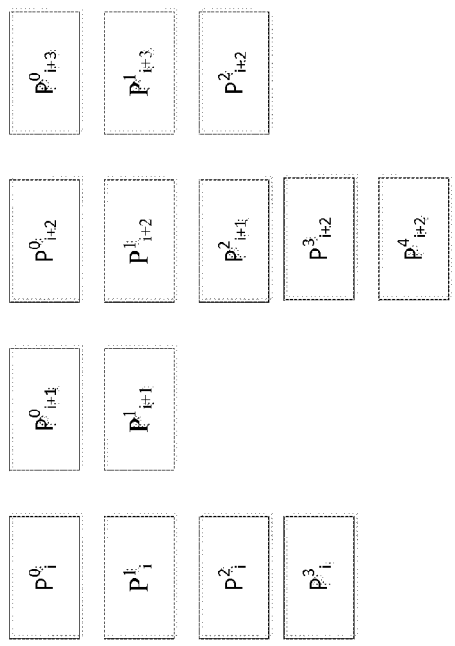
FIG. 2 is a schematic diagram of polymorphic content format according to the prior art.
Figure 3:
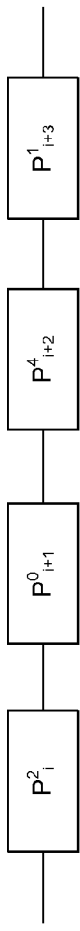
FIG. 3 is a schematic diagram of a unique version of content according to the prior art.
Figure 4:
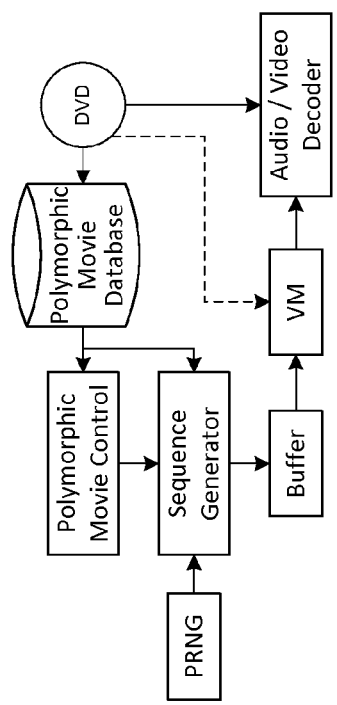
FIG. 4 is a schematic diagram of a player architecture according to the prior art.
Figure 5:
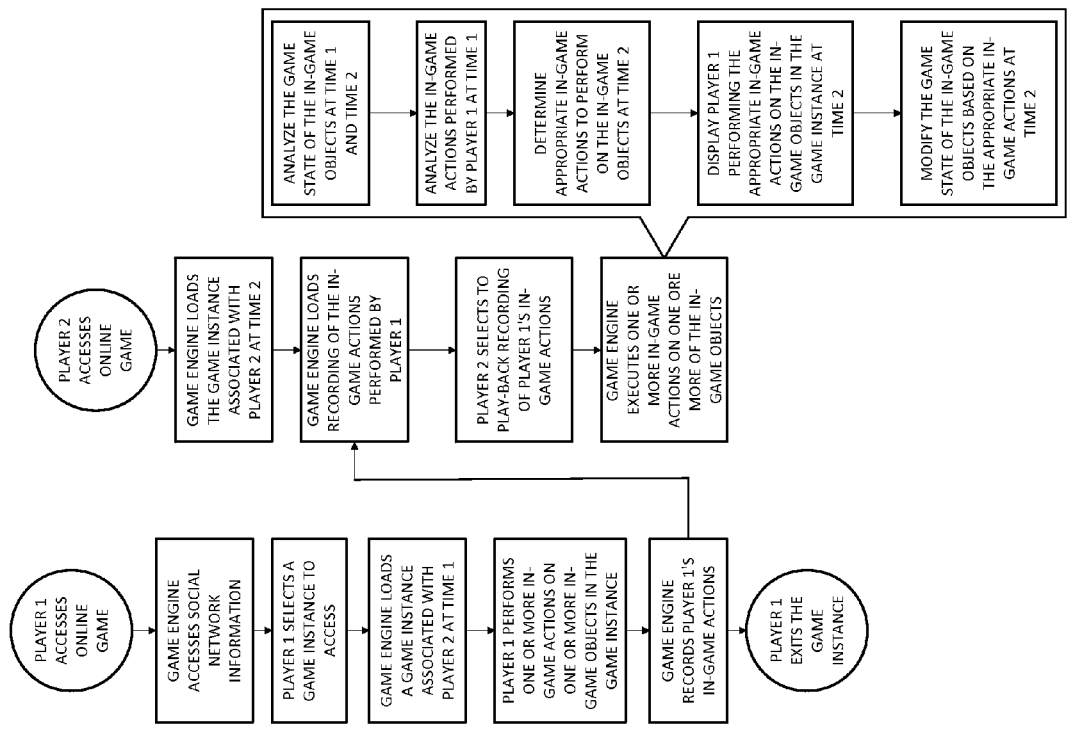
FIG. 5 is a schematic diagram of an interactive game according to the prior art.

A significant portion of the revenue from the entertainment or movie industry is made in sales of movie titles. It is desirable to protect this and other revenue streams. Currently-available formats, such as those described above, are of increasingly less interest to consumers, and the content is increasingly being redistributed online over the internet and other networks, including peer-to-peer architectures.

The potential of polymorphic content requires a receiver or player architecture to actively integrate knowledge about the end-user (such as user preferences) into the content rendering process. Existing content protection techniques (DRM, CA, etc.) use a different receiver or player architecture, which is not suited for the protection of polymorphic content.

While systems, media and computer-implemented methods are described herein by way of example and embodiments, those skilled in the art recognize that systems and methods for securing and/or personalizing polymorphic content are not limited to the embodiments or drawings described. Any headings used herein are for organizational purposes only and are not meant to limit the scope of the description or the claims. Certain terminology is used in the following description for convenience only and is not limiting. As used herein, the word "may" is used in a permissive sense (e.g., meaning having the potential to) rather than the mandatory sense (e.g., meaning must). Similarly, the words "a," "an" and "the" mean "at least one," and the words "include," "includes" and "including" mean "including, but not limited to."

In accordance with one embodiment, the present disclosure is generally directed to a secured content protection personalization module that processes protected content (such as, but not limited to, metadata) based on a profile (e.g., preference information) of a user in a tamper resistant environment of a polymorphic content player. As the content personalization adapts the player output to a specific end user, the output is only relevant to a small portion of the end user population. As a result, copying or redistributing the specific output is less valuable to hackers, at least because only a relatively small portion of the population may be interested in viewing the content. By including the content personalization into the tamper resistant environment, it becomes difficult for an attacker or hacker to obtain a clear text version of the portion of the content (e.g., metadata) that is essential to playback the polymorphic content. In addition, the systems and methods of the present disclosure may provide valuable information regarding the identity and/or preferences of one or more of the most recent viewers of the content.

In another embodiment, a secured content personalization module of the present disclosure may also implement known content protection functions, such as the generation of a content decryption key and/or the bulk decryption of the protected content. Such an embodiment also prevents access of an attacker to clear text content data (e.g., metadata), which further enhances the polymorphic content protection.

In yet another embodiment of the present disclosure, a user preference input may include feedback to gameplay fragments forming part of the polymorphic content end user experience. Playing a game may provide the end user with the ability to express preferences in an unconscious or rather effortless way. Securing the gameplay makes it difficult for an attacker to observe user preference inputs, which further enhances security of the polymorphic content player. This protection scheme may operate for variant content delivery models (e.g., broadcasting, live streaming of IPTV, pre-recorded content, etc.).

Disclosed embodiments provide systems, computer-implemented methods, and computer-readable media for one or more secured content protection personalization modules that process protected content, such as, but not limited to, structural or descriptive metadata, based on a profile of a user in a tamper resistant environment of a polymorphic content player. The term "profile" is broadly defined herein, and may, for example, be one or more predetermined parameters based upon previous action by a user, such as content previously viewed by the user. Alternatively, the profile may consist of preference information received from a user. Thus, the profile may be stored, created, received, modified and/or updated according to one or more embodiments of the present disclosure. The term "player" is broadly defined herein, and may, for example, be an apparatus or system capable of at least contributing to the rendering of media, such as audio, visual and/or audiovisual information and/or entertainment. Non-limiting examples of a player in accordance with the present disclosure is a computer system (with or without a display or monitor), a television, a movie projection system, a stereo system, a mobile telephone, a personal computing tablet, a set top box, and the like.

One industry application for embodiments of the present disclosure is the protection of a new content format that the movie studios are considering for pre-recorded content. By making the physical device and/or content more interesting to a viewer, and/or making the content output highly personalized, as described below, the new format should not be as vulnerable to the unauthorized redistribution of recorded content output. An entire video or movie may be secured by the systems and/or methods of the present disclosure, or only a portion or discrete segments may be secured as disclosed herein.

More particularly, an embodiment of the present disclosure is directed to a content player for rendering polymorphic content that may select a sequence of alternative content parts from the polymorphic content based on a profile containing content preferences of an end user. As described in the background section, polymorphic content may contain multiple alternative content parts from which the player must make a selection. The prior art describes a random selection. An embodiment of the present disclosure uses a user profile (e.g., user preferences) to control content selection (possibly in combination with one or more other controls), such that the selected output sequence of content parts is personalized. The personalization makes the generated content more enjoyable for the end user and less interesting to other viewers with different preferences. Hence, personalization also reduces the commercial value of recording the generated content output for unauthorized redistribution.

Referring to FIGS. 6-18, a player architecture according to embodiments of the present disclosure may include a personalization module that operates on content metadata describing which alternate content parts are contained in the polymorphic content and for each alternative content part one or more attributes (for example, happy, sad, violent, romantic, action, drama, etc.) related to the type of content contained in the alternative content part. The personalization module may use a user profile (possibly with user preferences) for determining a matching output sequence. The personalization module may then use the determined output sequence to generate the content stream by, for example, reading the content parts from a pre-recorded disc, retrieving the content parts from a remote content server, and/or filtering alternative content parts from a broadcast stream (e.g., from a server of a network, such as the internet).

Figure 6:
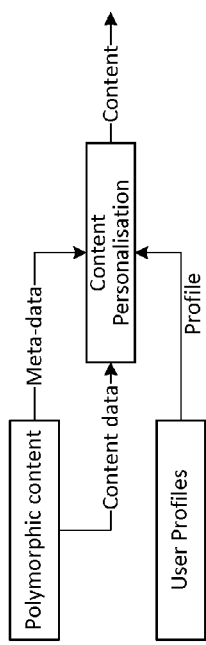
FIG. 6 is a schematic diagram of a player architecture according to an embodiment of the present disclosure.

As shown in FIG. 6, the present disclosure may utilize stored user preferences and/or stored information regarding the user's past behavior (e.g., previous content viewed or previous actions taken by the user) to control the content selection. This method ensures that the generated stream closely matches the interest of a viewer (e.g., consumer or end-user). In turn, this reduces the value of recording the output of the generated content stream, which makes the piracy less desirable. In order to create the user profile, the player may receive, access or obtain one or more sources of information, such as, but not limited to, previously played content, links from social media and/or information from content providers. The profile information may be stored prior to a beginning of playing the polymorphic content.

Figure 6A:
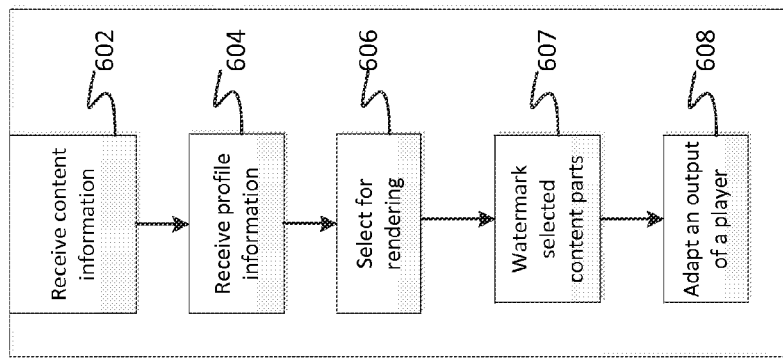
FIG. 6A is a schematic diagram of method according to the embodiment shown in FIG. 6.

FIG. 6A shows a non-limiting example of a method according to the present disclosure for selecting a sequence of content parts from polymorphic content of an audiovisual presentation based on at least one profile of a user. The polymorphic content includes alternative content parts. The method may include receiving content information associated with polymorphic content (step 602), receiving profile information of a user (step 604), and selecting for rendering, from among the alternative content parts, a sequence of content parts from the polymorphic content based on at least a portion of the profile information (step 606). The terms "receive," "receives," and "receiving" are broadly defined herein and may, for example, mean that information is available, accessible or capable of being obtained, and not necessarily limited to the act of a transmission being received. The terms "receive," "receives," and "receiving" may include retrieval from storage and the like. The method may also include adapting or generating an output of the player to include the selected sequence (step 608). The method may include assigning or applying a watermark to the selected content parts (step 607). The watermarks of the altered content may be aggregated, combined and/or processed to create a content/user specific watermark for security.

The above-described steps, and steps described herein as part of other methods according to the present disclosure, may be performed in any of a variety of different sequences or orders. For example, at least certain steps may be performed sequentially (e.g., in series) or concurrently (e.g., in parallel). In addition, the steps of the present method may be combined with one or more steps described in methods according to other embodiments herein or eliminated, if appropriate.

Figure 7:
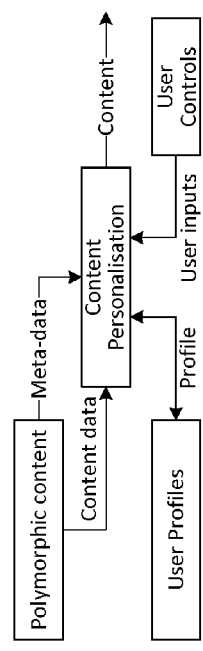
FIG. 7 is a schematic diagram of a player architecture, wherein a local user input may be used to create, modify, update and/or adapt a profile.

As shown in FIG. 7, the player may receive, access or obtain local user input to create and/or adapt the user profile. Additional user controls may enable the end-user to configure the profile and/or to provide feedback on the rendered content. The personalization module may use such information to complement and/or update the information in the user profile. Non-limiting examples of a user control are an interactive, electronic program guide-like interface to enable the user to express content preferences and a "like" button to strengthen the preference for the currently playing type of content. Alternatively, the input or user control may be an electronic menu of a gaming controller, a TV-like remote control, a voice-activated controller, or a motion-activated controller, for example. In at least one embodiment, the input may be a sensor that monitors or senses certain action or movement by the user, such as when the user's eyes move or focus on a certain portion of the display. As a result of the above-described inputs, the output of the player may be created and/or modified.

Figure 7A:
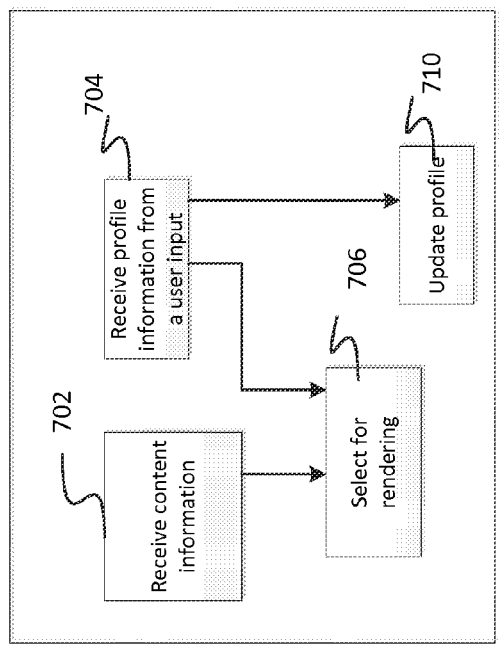
FIG. 7A is a schematic diagram of method according to the embodiment shown in FIG. 7.

FIG. 7A shows a non-limiting example of a method according to the present disclosure. The method may include receiving content information associated with polymorphic content (step 702), receiving profile information of a user from a user input (step 704), and selecting for rendering, from among the alternative content parts, a sequence of content parts from the polymorphic content based on at least a portion of the profile information (step 706). The profile may be updated based upon the information received from the user input (step 710).

Figure 8:
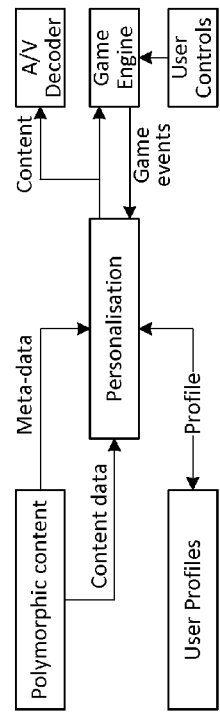
FIG. 8 is a schematic diagram of a player architecture according to an embodiment of the present disclosure, wherein a game may be utilized.

Users may find that the use of local inputs to configure a profile results is tedious, or otherwise inconvenient. As shown in FIG. 8, in one embodiment of the present disclosure, a game, for example, may engage the viewer and also serve to influence the selected output sequence of alternative content parts. The game content, which may be in a variety of forms, such as, but not limited to, trivia, car driving, hunting, boxing, animated environments, puzzles, etc., may be included in the polymorphic content format. Alternatively, the game content or gameplay may be separate and distinct from the polymorphic content. The game content also may be an extension of the movie plot. For example, the viewer may be able to control at least certain actions of one or more characters of the movie in a fictional or virtual world. Such game genre may be referred to as "role-playing games." One benefit of this approach is that the game experience matches the movie subject.

When the player finds content parts with game content, it may load the game code into a game engine to enable the viewer to play the game. During gameplay, some game events (for example, selecting an item, answering a question, performing a step or move, reaching a score, entering a region, exiting a game, etc.) may be returned to the personalization module. The game events may provide at least some information regarding the user preferences and/or may serve to influence or even dictate the output sequence for the polymorphic content. For example, a "fight-or-flight" decision may indicate the end-user's preference for "action" content. Similar game decisions may drive other profile information. Based at least on the received feedback, the personalization module may create, regenerate or modify the output sequence of content parts and/or update the user profile. The game engine can be a dedicated firmware game engine or it can be implemented within a virtual machine, such as the Java Virtual Machine or a special DVD player virtual machine.

Figure 8A:
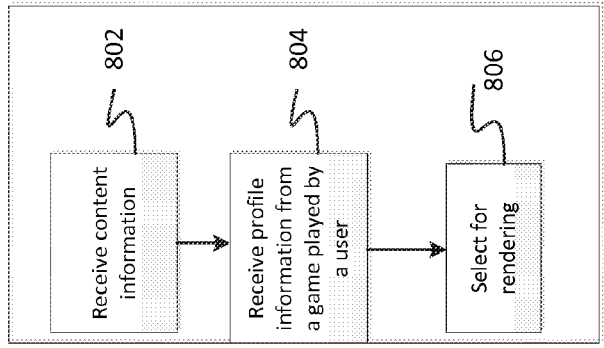
FIG. 8A is a schematic diagram of method according to the embodiment shown in FIG. 7.

FIG. 8A shows a non-limiting example of a method according to the embodiment of FIG. 8. The method may include receiving content information associated with polymorphic content (step 802), receiving profile information of a user based at least upon a game played by the user (step 804), and selecting for rendering, from among the alternative content parts, a sequence of content parts from the polymorphic content based on at least a portion of the profile information (step 806).

As the commercial value of the polymorphic content may be substantially higher than the value of the generated output, it can be important for the player to protect or secure the personalization function that processes the polymorphic content. An architecture diagram for a polymorphic content player with a secured personalization module is shown in FIG. 9. FIG. 9 shows the player receiving and/or processing polymorphic content that includes protected metadata, where the notation "{Metadata}" indicates that the information between curly brackets is protected. Examples of protection are encryption and/or data transformation (as used in tamper resistant software implementations). In particular, in one example, the metadata can be secured using data transformations, as the player may have the appropriately modified functionality that operates on the transformed data. A secured personalization module may operate on protected metadata by first implementing an inverse protection operation before using, accessing and/or receiving the data for generating a personalized output sequence. The other inputs to the secured personalization module might not be protected in such an embodiment of the present disclosure. FIG. 10 shows of modified version of the player shown in FIG. 9, wherein the modified version includes a game (such as that described with respect to FIG. 8).

Figure 10A:
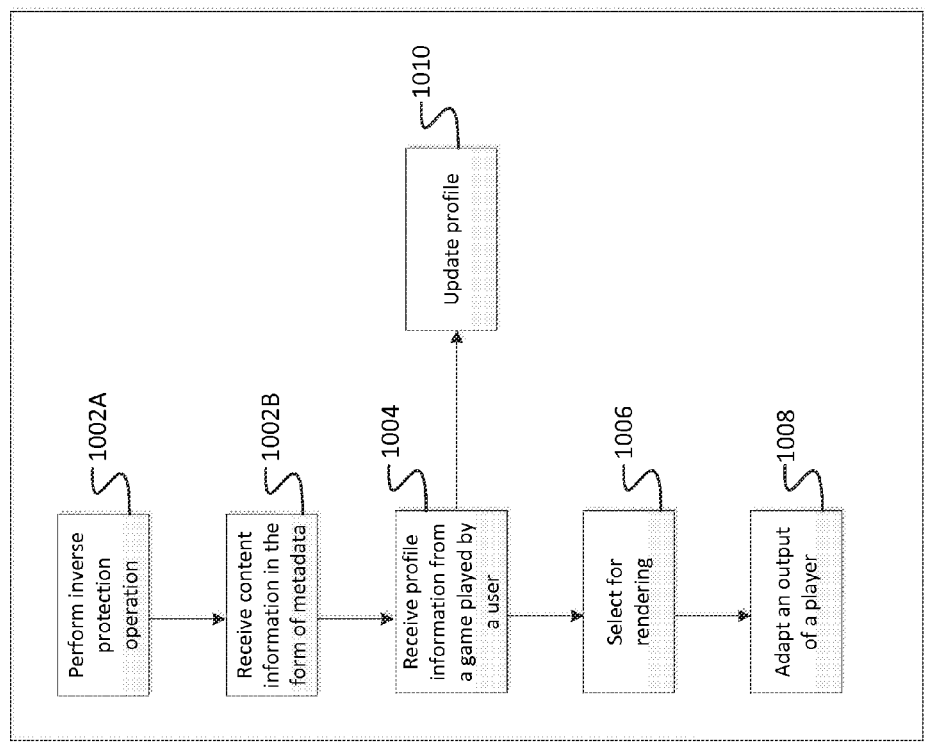
FIG. 10A is a schematic diagram of method according to the embodiment shown in FIG. 10.

FIG. 10A shows a non-limiting example of a method according to the embodiment of FIG. 10. The method may include performing an inverse protection operation (step 1002A), receiving content information associated with polymorphic content (step 1002B), receiving profile information of a user based at least upon a game played by the user (step 1004), and selecting for rendering, from among the alternative content parts, a sequence of content parts from the polymorphic content based on at least a portion of the profile information (step 1006). The inverse protection operation (step 1002A) may be performed within the secure personalization module. The method may also include adapting or generating an output of the player to include the selected sequence (step 1008). The profile may be updated based upon the information received from the user input (step 1010). Either of both of the steps of receiving content information (step 1002B) and receiving profile information (step 1004) may including storing (either permanently or temporarily) the received information.

FIG. 11 shows a player architecture variant using cryptography for protecting content, such as metadata. In particular, FIG. 11 shows an inverse protect module that includes two decryption modules. The secured personalization module may derive the key K from decrypting a key loading message $\{K\}_{SK}$ with a stored key SK. The implementation may use a more complex key management structure. A common element in key ladders is that they are based on some secret data held within the secured module. This applies to key ladders using symmetric key cryptography as well as those using public key cryptography.

Figure 11A:
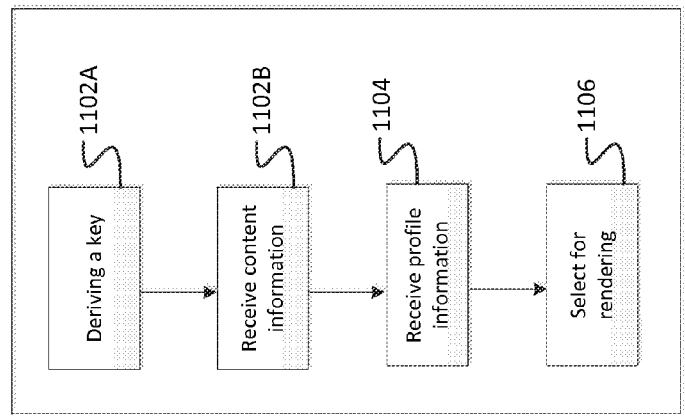
FIG. 11A is a schematic diagram of method according to the embodiment shown in FIG. 11.

FIG. 11A shows a non-limiting example of a method according to the embodiment of FIG. 11. The method may include deriving the key K from decrypting a key loading message $\{K\}_{SK}$ with a stored key SK (step 1102A), receiving content information associated with polymorphic content (step 1102B), receiving profile information of a user (step 1104), and selecting for rendering, from among the alternative content parts, a sequence of content parts from the polymorphic content based on at least a portion of the profile information (step 1106).

Figure 12:
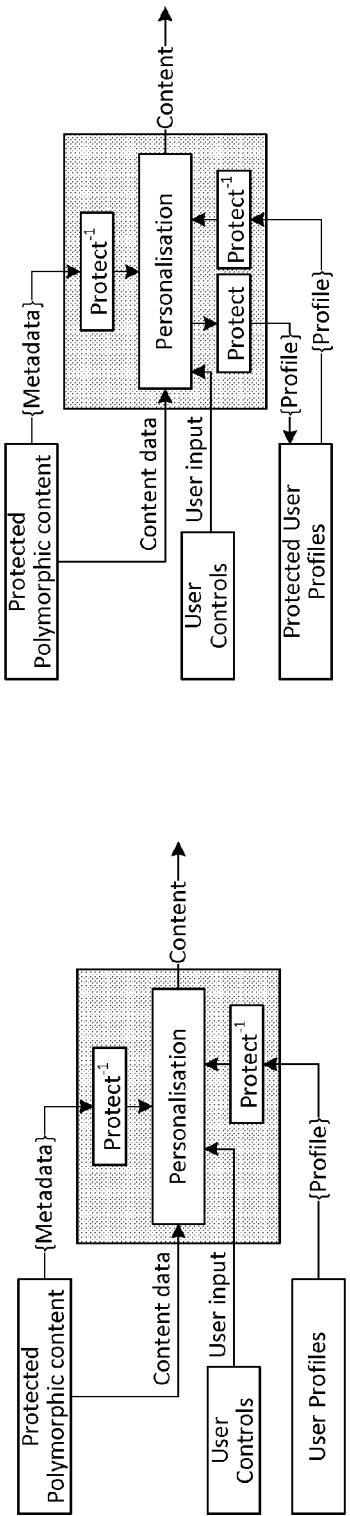
FIG. 12 is a schematic diagram of a player architecture with a secured personalization module according to an embodiment of the present disclosure, wherein the player is secured against attack.

The implementation shown in FIG. 11 and described above protects the content (e.g., metadata), but an attacker may still be able modify the user profile(s) and/or the user input(s) in order to obtain different outputs and correlate each output with a user profile. The player variant shown in FIG. 12 secures the profile(s) against such an attack. FIG. 12 shows a secured personalization module that processes protected metadata as well as protected profile data. As the profile is now protected, an attacker cannot access, read or modify the profile preferences. As in the previous embodiment(s), the protection may use data transformation techniques or cryptographic primitives.

Figure 12A:
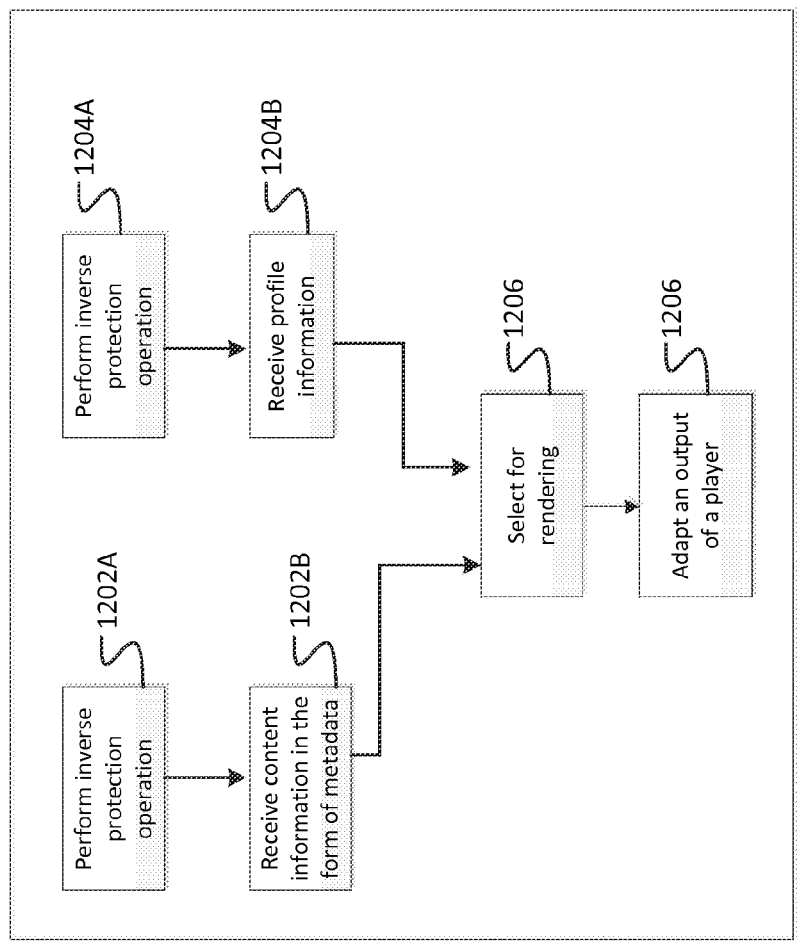
FIG. 12A is a schematic diagram of method according to the embodiment shown in FIG. 12.

FIG. 12A shows a non-limiting example of a method according to the embodiment of FIG. 12. The method may include performing an inverse protection operation (step 1202A), receiving content information associated with polymorphic content (step 1202B), performing an inverse protection operation (step 1204A), receiving profile information of a user (step 1204B), and selecting for rendering, from among the alternative content parts, a sequence of content parts from the polymorphic content based on at least a portion of the profile information (step 1206). One or both of the inverse protection operations (steps 1202A and 1204A) may be performed within the secure personalization module.

Figure 13:
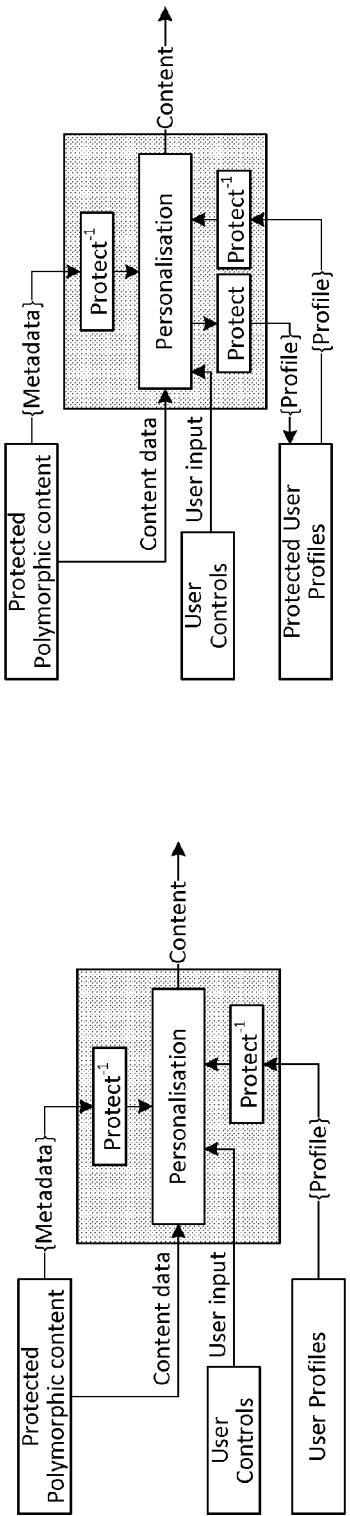
FIG. 13 is a schematic diagram of a player architecture with a secured personalization module that can update protected profile data according to an embodiment of the present disclosure.
Figure 14:
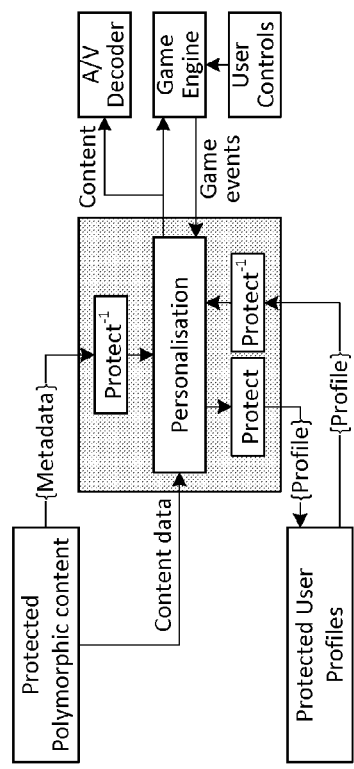
FIG. 14 is a schematic diagram of another modified version of a player architecture with a secured personalization module shown in FIG. 13.

FIG. 13 shows player architecture that can update the protected profile data. In particular, FIG. 13 shows a protect module that protects updated profile data before storing it into the protected user profiles storage. The protect module and an inverse protect module may be closely linked, but need not implement the same function. The construction of such protect and inverse protect modules are well known to those skilled in the art. FIG. 14 shows a modified version of the player architecture shown in FIG. 13, wherein the modified version includes a diversion or game (such as that described with respect to FIG. 8) and user controls (such as that described with respect to FIG. 12).

Figure 14A:
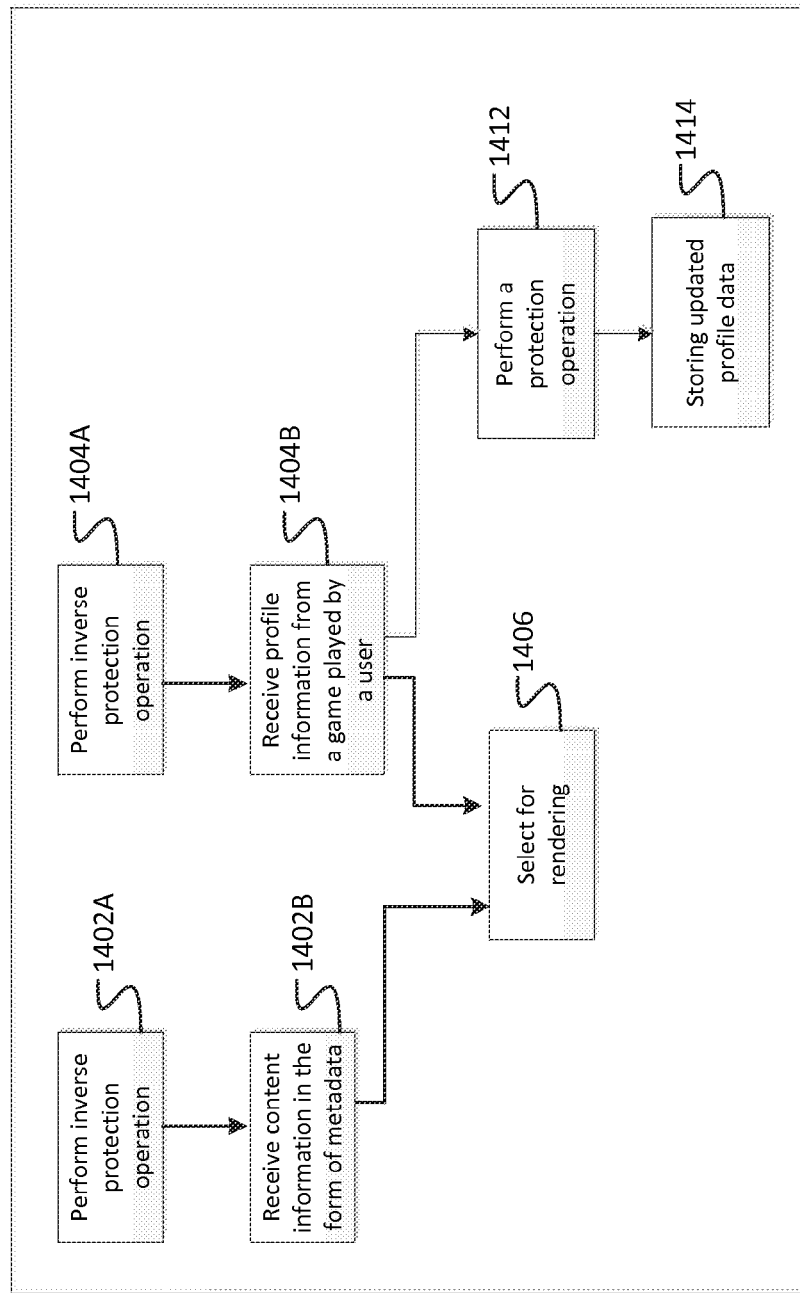
FIG. 14A is a schematic diagram of method according to the embodiment shown in FIG. 14.

FIG. 14A shows a non-limiting example of a method according to the embodiment of FIG. 14. The method may include performing an inverse protection operation (step 1402A), receiving content information associated with polymorphic content (step 1402B), performing an inverse protection operation (step 1404A), receiving profile information of a user based at least in part upon a game played by the user (step 1404B), and selecting for rendering, from among the alternative content parts, a sequence of content parts from the polymorphic content based on at least a portion of the profile information (step 1406). The method may also include performing a protection operation (step 1412) and storing the updated profile information or updating the profile (step 1414).

Figure 15:
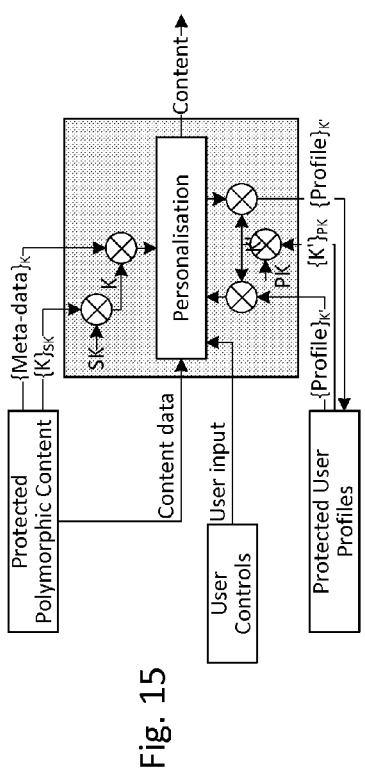
FIG. 15 is a schematic diagram of a player architecture with a secured personalization module that employs cryptographic primitives for protection according to an embodiment of the present disclosure.

FIG. 15 shows an embodiment of the present disclosure where a secured personalization module uses cryptographic primitives for the protection. In particular, FIG. 15 shows a secured personalization module that decrypts a key loading message $\{K\}_{SK}$ with a stored key SK to obtain the key K to decrypt the protected metadata $\{Metadata\}_K$. The secured personalization module may also derive the key K' from decrypting a key loading message $\{K'\}_{PK}$ with a stored profile key PK. In practical applications, different key management schemes may be used, as understood by those skilled in the art. Implementations also could share some of the keys in order to simplify the key management. The encryption operations shown in FIG. 15 use symmetric cryptography, but this also can be implemented using public key cryptography.

Figure 15A:
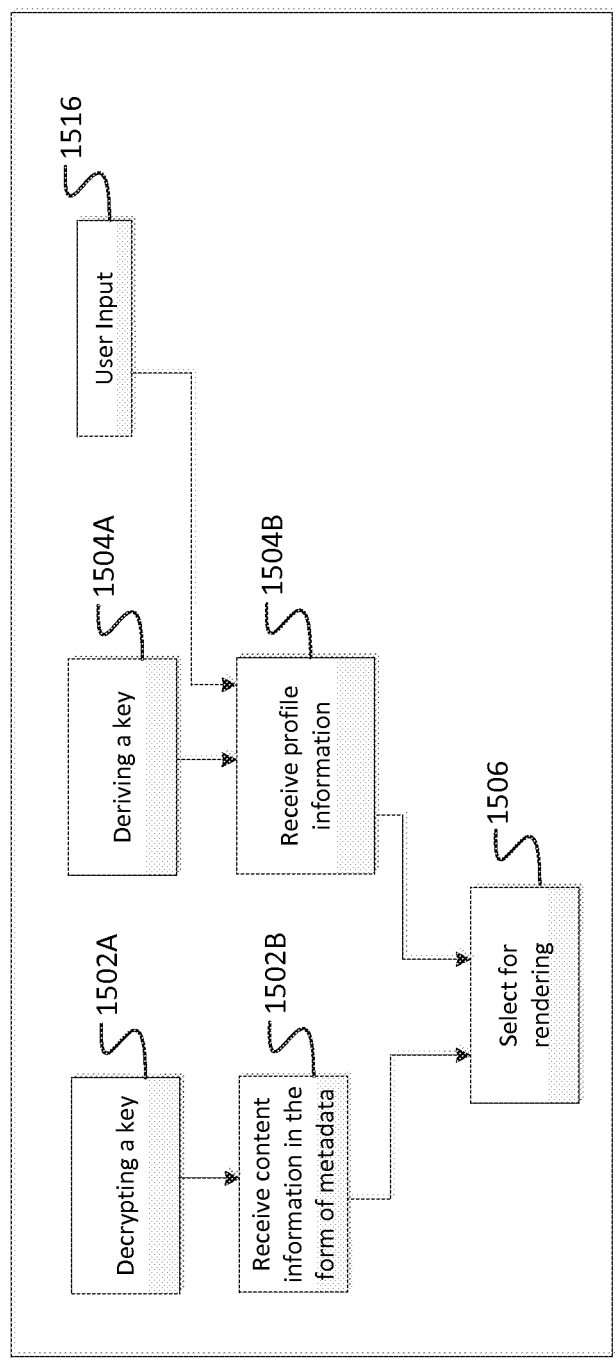
FIG. 15A is a schematic diagram of method according to the embodiment shown in FIG. 15.

FIG. 15A shows a non-limiting example of a method according to the embodiment of FIG. 15. The method may include decrypting a key loading message $\{K\}_{SK}$ (step 1502A), receiving content information associated with polymorphic content (step 1502B), derive the key K' from decrypting a key loading message $\{K'\}_{PK}$ with a stored profile key PK (step 1504A), receiving profile information of a user (step 1504B), and selecting for rendering, from among the alternative content parts, a sequence of content parts from the polymorphic content based on at least a portion of the profile information (step 1506). The method employing a user input to receive profile information of the user (step 1516).

Figure 16:
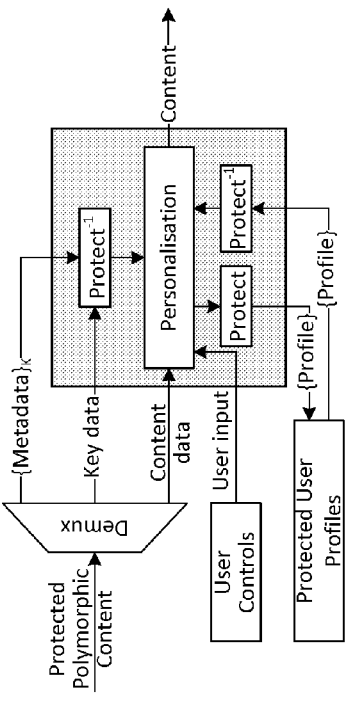
FIG. 16 is a schematic diagram of a player architecture with a secured personalization module that operates on broadcast protected polymorphic content according to an embodiment of the present disclosure.

The present disclosure is not limited to operate on pre-recorded polymorphic content. For example, the player variant shown in FIG. 16 operates on broadcast protected polymorphic content. FIG. 16 shows protected polymorphic content that is broadcast to the player architecture. The player receives the broadcast stream and uses a de-multiplexer module ("Demux") to extract the relevant data streams that the secured personalization module uses to generate the output content.

Figure 16A:
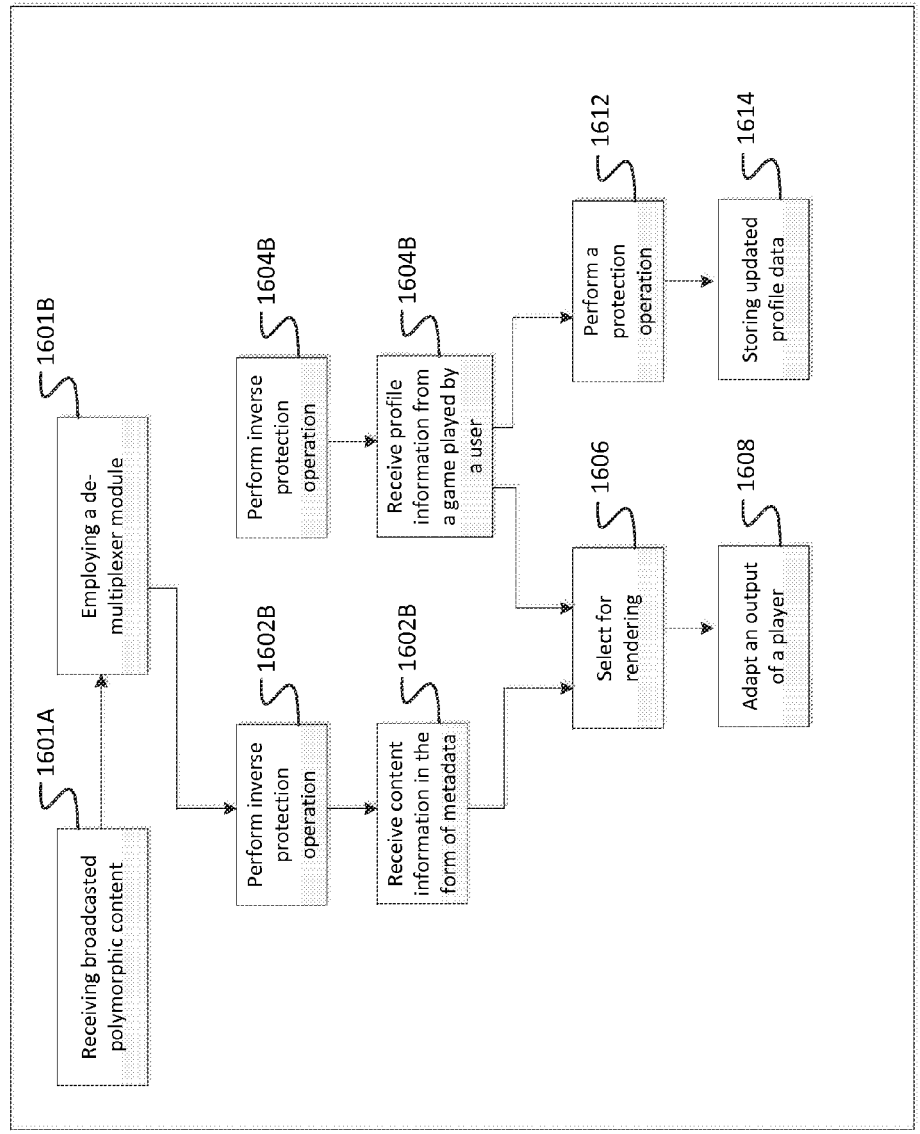
FIG. 16A is a schematic diagram of method according to the embodiment shown in FIG. 16.

FIG. 16A shows a non-limiting example of a method according to the embodiment of FIG. 16. The method may include receiving broadcasted polymorphic content (step 1601A) and employing a de-mulitiplexer module (step 1601B). The method may also include performing an inverse protection operation (step 1602A), receiving content information associated with polymorphic content (step 1602B), performing an inverse protection operation (step 1604A), receiving profile information of a user based at least in part upon a game played by the user (step 1604B), and selecting for rendering, from among the alternative content parts, a sequence of content parts from the polymorphic content based on at least a portion of the profile information (step 1606). The method may also include adapting or generating an output of the player to include the selected sequence (step 1608). In addition, the method may include performing a protection operation (step 1612) and storing the updated profile information or updating the profile (step 1614).

Figure 17:
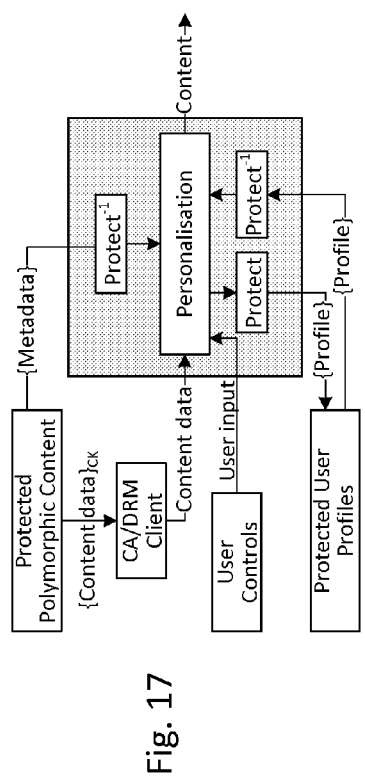
FIG. 17 is a schematic diagram of a player architecture with a secured personalization module that uses a CA/DRM Client to implement an access function to protected content according to an embodiment of the present disclosure.

The player variants shown in FIG. 16 protect the personalization of polymorphic content, which represents the additional commercial value over the commercial value of a single content output variant. However, known content protection techniques can be applied to the content data and to any of the content outputs, as shown in FIG. 17. In particular, FIG. 17 shows the use of a CA/DRM Client to implement the access function to the protected content. The content output format can be protected using known techniques, e.g., using an HDMI connector. FIG. 17 does not show the key handling required for the various protect modules, as these are either known or have been described above. FIG. 17 also does not show the variant with a game engine, but the additional CA/DRM Client can be added to any of the earlier described player variants.

The personalization modules can be implemented in a Trusted Execution Environment (TEE) or can be implemented as a secured software application. The secured personalization module may implement a fixed personalization function, but this also could be implemented using a virtual machine (VM) or using a script interpreter. The VM application or the script can then implement the selection of the content parts based on the profile data and the local user inputs as described above. These implementation techniques are known from existing content players, personal computers (PCs) and mobile devices. The data and/or code to implement the personalization function can be stored on the optical disc or may require parts of the information to be downloaded on demand (many content players, TVs and game consoles already are network enabled).

Figure 18:
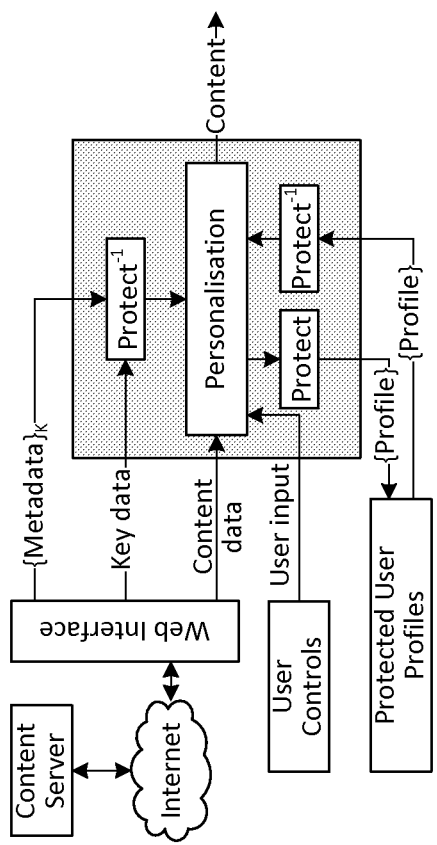
FIG. 18 is a schematic diagram of a player architecture with a secured personalization module that accesses polymorphic content from a web-based content server according to an embodiment of the present disclosure.

FIG. 18 shows a secured personalization module that accesses polymorphic content from a web-based content server. Instead of issuing data retrieval commands for prerecorded content, FIG. 18 shows a secured personalization module that has a web interface that translates content retrieval commands to content requests to an internet content server. Although, only one particular embodiment is shown in FIG. 18, the same approach may be applied to any of the embodiments described above.

Figure 18A:
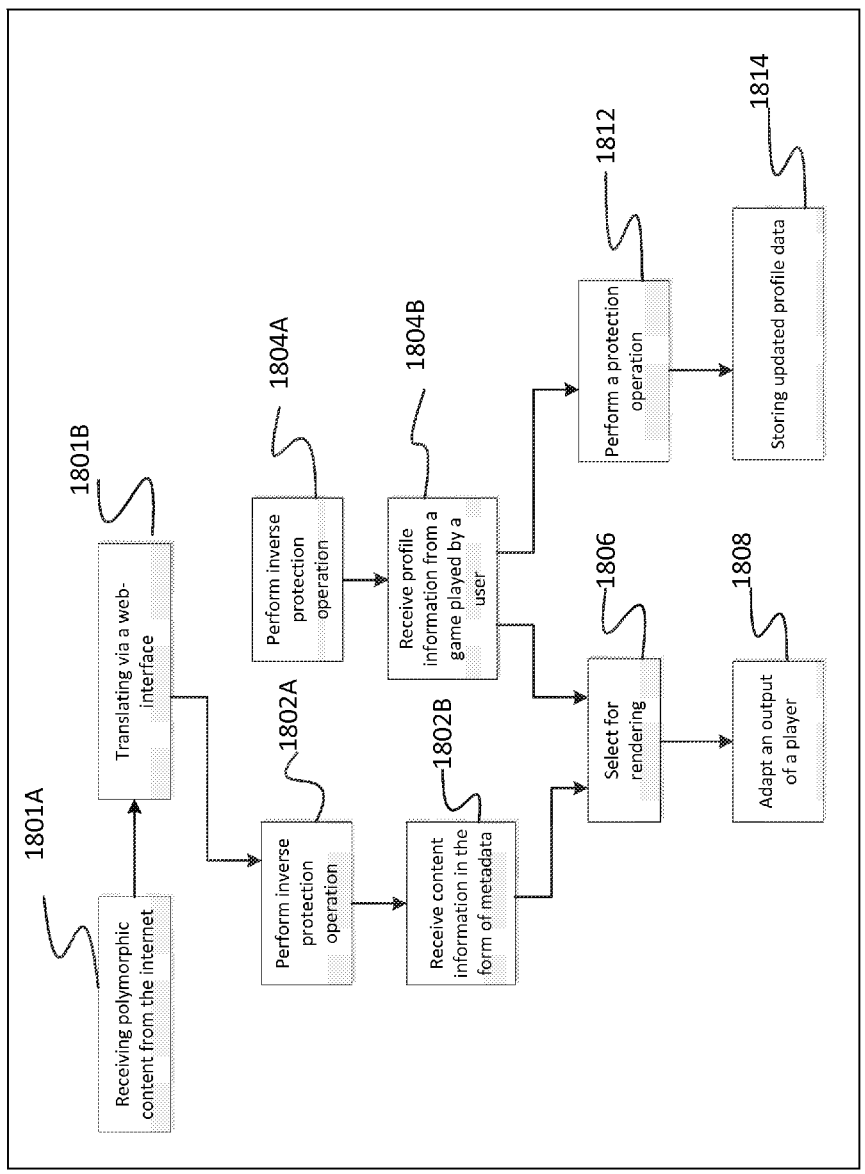
FIG. 18A is a schematic diagram of method according to the embodiment shown in FIG. 18.

FIG. 18A shows a non-limiting example of a method according to the embodiment of FIG. 18. The method may include receiving polymorphic content from the internet (step 1801A) and translating, via a web interface, content retrieval (step 1801B). The method may also include performing an inverse protection operation (step 1802A), receiving content information associated with polymorphic content (step 1802B), performing an inverse protection operation (step 1804A), receiving profile information of a user based at least in part upon a game played by the user (step 1804B), and selecting for rendering, from among the alternative content parts, a sequence of content parts from the polymorphic content based on at least a portion of the profile information (step 1806). The method may also include adapting or generating an output of the player to include the selected sequence (step 1808). In addition, the method may include performing a protection operation (step 1812) and storing the updated profile information or updating the profile (step 1814).

Various algorithms can be used to select content parts. As an example, a database or lookup table can be used to correlate profile information (such as user inputs to a game, information about user actions, or user preferences) to selected content parts. Table 1 below illustrates an example of such a lookup table:

TABLE 1

| Profile Information | Content Part |
|---|---|
| User Prefers Action Scenes | Content Parts $P^1_{i+3}$, $P^3_{i+4}$, and $P^6_{i+8}$ |
| User Prefers Horror Scenes | Content Parts $P^3_i$ and $P^3_{i+4}$ |
| User Prefers Happy Scenes | Content Parts $P^2_{i+1}$, $P^1_{i+2}$, $P^5_{i+3}$, and $P^1_{i+7}$ |

Of course, any appropriate algorithm can be used to select content parts as long as the profile information can be reasonably resolved to one or more content parts. For example, a user profile may include a series of preference ratings for various content types. Each content portion may have a corresponding profile with one or a series of preference ratings. A matching algorithm may be employed to find a best match for all alternative content portions. A variant algorithm may include the step of considering all pairings or matches that make up a rendering, such as a movie, for example, and optimize over a larger set of selections. If all matches for a single "timeslot" favor one preference rating in the user profile, that preference may dominate the overall selections. If the selection process considers all selections (or a wider range of selections) some locally sub-optimal preference matches may result in a more balanced overall matching.

Figure 19:
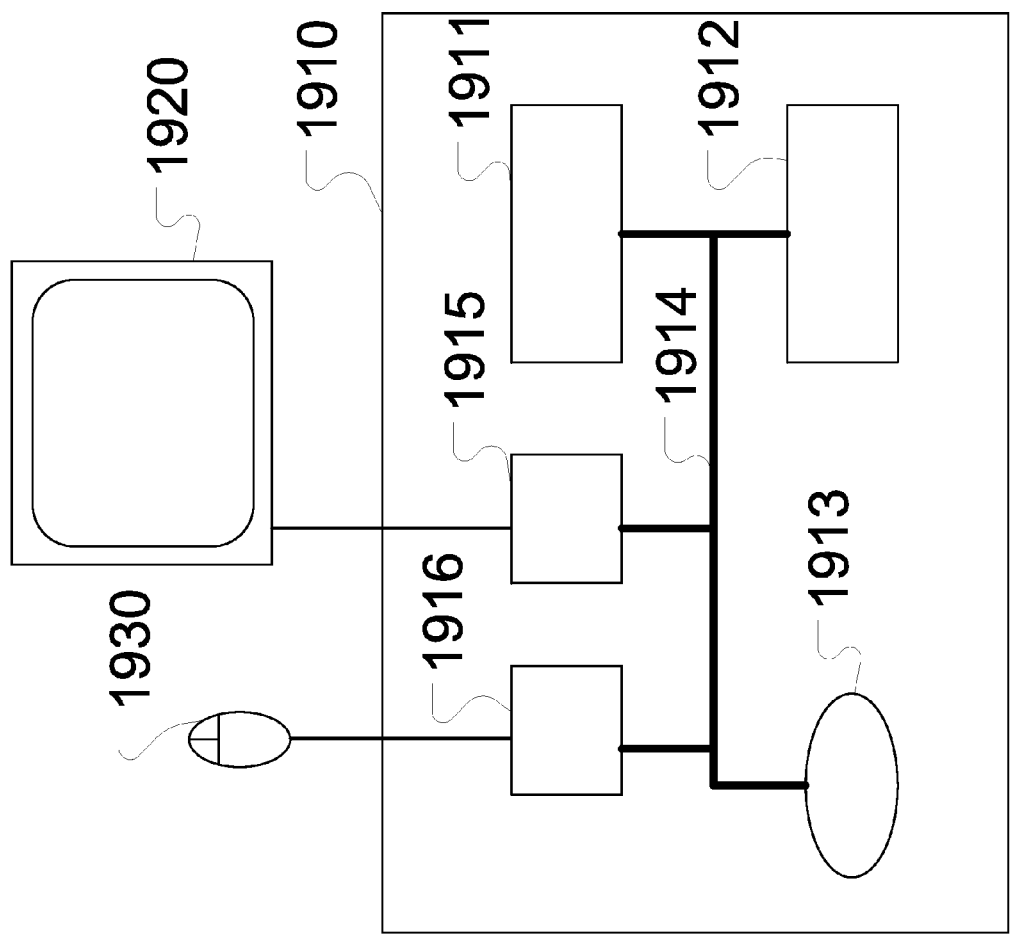
FIG. 19 shows an exemplary computing device useful for performing at least certain processes disclosed herein.

One or more of the above-described techniques and/or embodiments may be implemented with or involve software, for example modules executed on or more computing devices 1910 (see FIG. 19). Of course, modules described herein illustrate various functionalities and do not limit the structure or functionality of any embodiments. Rather, the functionality of various modules may be divided differently and performed by more or fewer modules according to various design considerations.

Each computing device 1910 may include one or more processing devices 1911 designed to process instructions, for example computer readable instructions (i.e., code), stored in a non-transient manner on one or more storage devices 1913. By processing instructions, the processing device(s) 1911 may perform one or more of the steps and/or functions disclosed herein. Each processing device may be real or virtual. In a multi-processing system, multiple processing units may execute computer-executable instructions to increase processing power. The storage device(s) 1913 may be any type of non-transitory storage device (e.g., an optical storage device, a magnetic storage device, a solid state storage device, etc. The storage device(s) 1913 may be removable or non-removable, and includes magnetic disks, magnetic tapes or cassettes, CD-ROMs, CD-RWs, DVDs, or any other medium which can be used to store information. Alternatively, instructions may be stored in one or more remote storage devices, for example storage devices accessed over a network or the internet.

Each computing device 1910 additionally may have memory 1912, one or more input controllers 1916, one or more output controllers 1915, and/or one or more communication connections 1940. The memory 1912 may be volatile memory (e.g., registers, cache, RAM, etc.), non-volatile memory (e.g., ROM, EEPROM, flash memory, etc.), or some combination thereof. In at least one embodiment, the memory 1912 may store software implementing described techniques.

An interconnection mechanism 1914, such as a bus, controller or network, may operatively couple components of the computing device 1910, including the processor(s) 1911, the memory 1912, the storage device(s) 1913, the input controller(s) 1916, the output controller(s) 1915, the communication connection(s) 1940, and any other devices (e.g., network controllers, sound controllers, etc.). The output controller(s) 1915 may be operatively coupled (e.g., via a wired or wireless connection) to one or more output devices 1920 (e.g., a monitor, a television, a mobile device screen, a touch-display, a printer, a speaker, etc.) in such a fashion that the output controller(s) 1915 can transform the display on the display device 1920 (e.g., in response to modules executed). The input controller(s) 1916 may be operatively coupled (e.g., via a wired or wireless connection) to an input device 1930 (e.g., a mouse, a keyboard, a touch-pad, a scroll-ball, a touch-display, a pen, a game controller, a voice input device, a scanning device, a digital camera, etc.) in such a fashion that input can be received from a user.

The communication connection(s) 1940 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

FIG. 19 illustrates the computing device 1910, the output device 1920, and the input device 1930 as separate devices for ease of identification only. However, the computing device 1910, the display device(s) 1920, and/or the input device(s) 1930 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). The computing device 1910 may be one or more servers, for example a farm of networked servers, a clustered server environment, or a cloud services running on remote computing devices.

It will be appreciated by those skilled in the art that changes could be made to the embodiments described above without departing from the broad inventive concept thereof. It is understood, therefore, that this disclosure is not limited to the particular embodiments identified herein, but it is intended to cover modifications within the spirit and scope of the present disclosure as defined by the appended claims.

What is claimed is:

1. A method implemented by one or more computing devices for selecting a sequence of content parts from polymorphic content of a visual presentation, the polymorphic content having alternative content parts which are encrypted with different encryption keys, the method comprising:
   receiving encrypted metadata associated with polymorphic content;
   receiving an encrypted content key loading message $\{K\}_{SK}$;
   decrypting the encrypted content key loading message $\{K\}_{SK}$ with a key SK to obtain a key K;
   decrypting the encrypted metadata with the key K to obtain unencrypted content metadata;
   receiving an encrypted user profile key loading message $\{K'\}_{PK}$
   deriving a key K' by decrypting the user profile key message with a profile key PK;
   using profile key K' to decrypt encrypted user profile information to obtain unencrypted user profile information; and
   selecting for rendering, from among the alternative content parts, a sequence of content parts from the polymorphic content based on the unencrypted user profile information and the unencrypted content metadata.

2. The method of claim 1, wherein the sequence of content parts simulates movement in a virtual world.

3. The method of claim 1, wherein at least some of the content parts are different angles of the same scene.

4. The method of claim 1, further comprising receiving a user input information and wherein the encrypted profile information is changed based on the user input.

5. The method of claim 1, further comprising a sensor generating the user input information by sensing movement of the user.

6. The method of claim 1, further comprising rendering the sequence of content parts.

7. The method of claim 1, wherein the encrypted metadata describes attributes of the content parts.

8. An apparatus for selecting a sequence of content parts from polymorphic content of a visual presentation, the polymorphic content having alternative content parts which are encrypted with different encryption keys, the apparatus comprising:
   one or more processors;
   at least one memory operatively coupled to at least one of the one or more processors and having instructions stored thereon which, when executed by the at least one of the one or more processors, causes the at least one of the one or more processors to control the following steps;
   receiving encrypted metadata associated with polymorphic content;
   receiving an encrypted content key loading message $\{K\}_{SK}$;
   decrypting the encrypted content key loading message $\{K\}_{SK}$ with a key SK to obtain a key K;
   decrypting the encrypted metadata with the key K to obtain unencrypted content metadata;
   receiving an encrypted user profile key loading message $\{K'\}_{PK}$
   deriving a key K' by decrypting the user profile key message with a profile key PK;
   using profile key K' to decrypt encrypted user profile information to obtain unencrypted user profile information; and
   selecting for rendering, from among the alternative content parts, a sequence of content parts from the polymorphic content based on the unencrypted user profile information and the unencrypted content metadata.

9. The apparatus of claim 8, wherein the sequence of content parts simulates movement in a virtual world.

10. The apparatus of claim 8, wherein at least some of the content parts are different angles of the same scene.

11. The apparatus of claim 8, further comprising receiving a user input information and wherein the encrypted profile information is changed based on the user input.

12. The apparatus of claim 8, wherein the user input information is generated by sensing movement of the user with a sensor.

13. The apparatus of claim 8, the instructions further comprising instructions, which when executed by at least one of the one or more processors, causes rendering of the sequence of content parts.

14. The apparatus of claim 8 wherein the encrypted metadata describes attributes of the content parts.

* * * * *